(12) United States Patent
Garms et al.

(10) Patent No.: US 7,765,530 B2
(45) Date of Patent: Jul. 27, 2010

(54) FIXED POINT DEPENDENCY DETERMINATION

(75) Inventors: Jesse Michael Garms, Seattle, WA (US); Timothy A. Wagner, Seattle, WA (US)

(73) Assignee: BEA Systems, Inc., San Jose, CA (US)

( * ) Notice: Subject to any disclaimer, the term of this patent is extended or adjusted under 35 U.S.C. 154(b) by 1035 days.

(21) Appl. No.: 11/493,123

(22) Filed: Jul. 26, 2006

(65) Prior Publication Data
US 2008/0028372 A1    Jan. 31, 2008

Related U.S. Application Data

(60) Provisional application No. 60/706,534, filed on Aug. 9, 2005.

(51) Int. Cl.
*G06F 9/45* (2006.01)
(52) U.S. Cl. .................. 717/140; 717/141; 717/142; 717/143; 717/148
(58) Field of Classification Search ................ 717/140, 717/141, 142, 143, 148
See application file for complete search history.

(56) References Cited

U.S. PATENT DOCUMENTS 6,381,742 B2 * 4/2002 Forbes et al. .......... 717/176

* cited by examiner

*Primary Examiner*—Wei Y Zhen
*Assistant Examiner*—Qamrun Nahar
(74) *Attorney, Agent, or Firm*—Squire, Sanders & Dempsey, LLP

(57) ABSTRACT

A system, method and media for a method for resolving dependencies given a first package and a first type, comprising determining one or more anti-dependencies for the first package; and compiling a first one of the anti-dependencies if at least one of the following is true: 1) the first anti-dependency has a compilation error; and 2) the first anti-dependency depends on a second package wherein the second package that has a second type with the same name as the first type. This abstract is not intended to be a complete description of, or limit the scope of, the invention. Other features, aspects and objects of the invention can be obtained from a review of the specification, the figures and the claims.

20 Claims, 3 Drawing Sheets

FIXED POINT DEPENDENCY DETERMINATION

CLAIM OF PRIORITY

This application claims benefit from U.S. Provisional Application No. 60/706,534, entitled FIXED POINT DEPENDENCY DETERMINATION, by Jesse Michael Garms and Timothy A. Wagner, filed Aug. 9, 2005, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

SUMMARY

One embodiment is a system that resolves dependencies given a first package and a first type that is added to the first package. The system determines one or more anti-dependencies for the first package and compiles a first one of the anti-dependencies when a shadow type exists for the first type. The shadow type has the same name as the first type and resides in a second package that the first anti-dependency depends on, the second package is different from the first package and the second package has a second type with the same name as the first type.

FIELD OF THE DISCLOSURE

The present disclosure relates generally to an efficient means for resolving dependencies as part of software compilation and, more particularly, a means for avoiding unnecessary recompilation of files containing one or more annotated programming language statements.

BACKGROUND

In a programming language such as Java® (Java is a trademark of Sun Microsystems, Inc.) where packaging or modules are used as a way to organize code bases, the placement of source files within packages contributes to important effects in the type system of the language and the data structures of both compilers and code-aware integrated development environments (IDEs). Some programming languages (e.g., Java) also possess an intrinsic syntax for metadata known as "annotations". Tools that process annotations and use them for analysis and code generation of artifacts can be integrated with both command line compilers and IDEs. In an incremental, real-time analysis system like an IDE, one of the most challenging questions is how to maintain the correctness of the type system and the incremental (minimal rebuild) properties that involve changes to packages and package contents.

The interaction of these two phenomenon are interesting and somewhat complex because of the nature in which they can interact: source files can refer to types that are produced by running annotation processors over the metadata in the original file; the "target" of such references will not exist until the metadata processing has completed. There is also the possibility of multiple "rounds": a generated source file may itself have annotations, which require further applications of annotation processors which may generate even more source files and so forth. Some, none, or all of these various source files from various "levels" of metadata-driven code generation may be in the same package, and may refer to types defined in other such files.

A naïve implementation would recompile individual source files too many times; in fact, it might not even have linear behavior in the number of source files. To add a final level of complexity, this may occur in a system which is multi-threaded, in which case different threads may be engaged in various states of compiling different files and processing annotations (or generating code from them).

DETAILED DESCRIPTION

The invention is illustrated by way of example and not by way of limitation in the figures of the accompanying drawings in which like references indicate similar items. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to one skilled in the art that the invention may be practiced without these specific details. In other instances, well-known features have not been described in detail so as not to obscure the invention.

Examples are given in terms of Java, however those of skill in the art will recognize that the teachings herein are applicable to many other programming languages (e.g., C#). The embodiments described below enable fixed point annotation-driven code generation, accurate tracking of package dependencies, forward and backward type references among all source files from any level of generation, and also provide for the minimum number of recompiles even in a multi-threaded/multi-processor realization.

Programming language annotations can save software developers from the tedium of writing boilerplate code. For example, many application program interfaces (APIs) require that certain repetitive steps (e.g., data transformations) be performed as part of invoking the API. Annotations can be used in these instances to generate the boilerplate code. Another area where annotations are useful is in maintaining "side files" in parallel with source code files. By way of illustration, a side file could be a deployment descriptor for an Enterprise Java Bean (EJB). Appropriate annotations in the EJB source code keep the deployment descriptor up-to-date with the EJB and avoid the problematic practice of a software developer manually keeping the deployment descriptor in sync with the EJB source.

Figure 1:
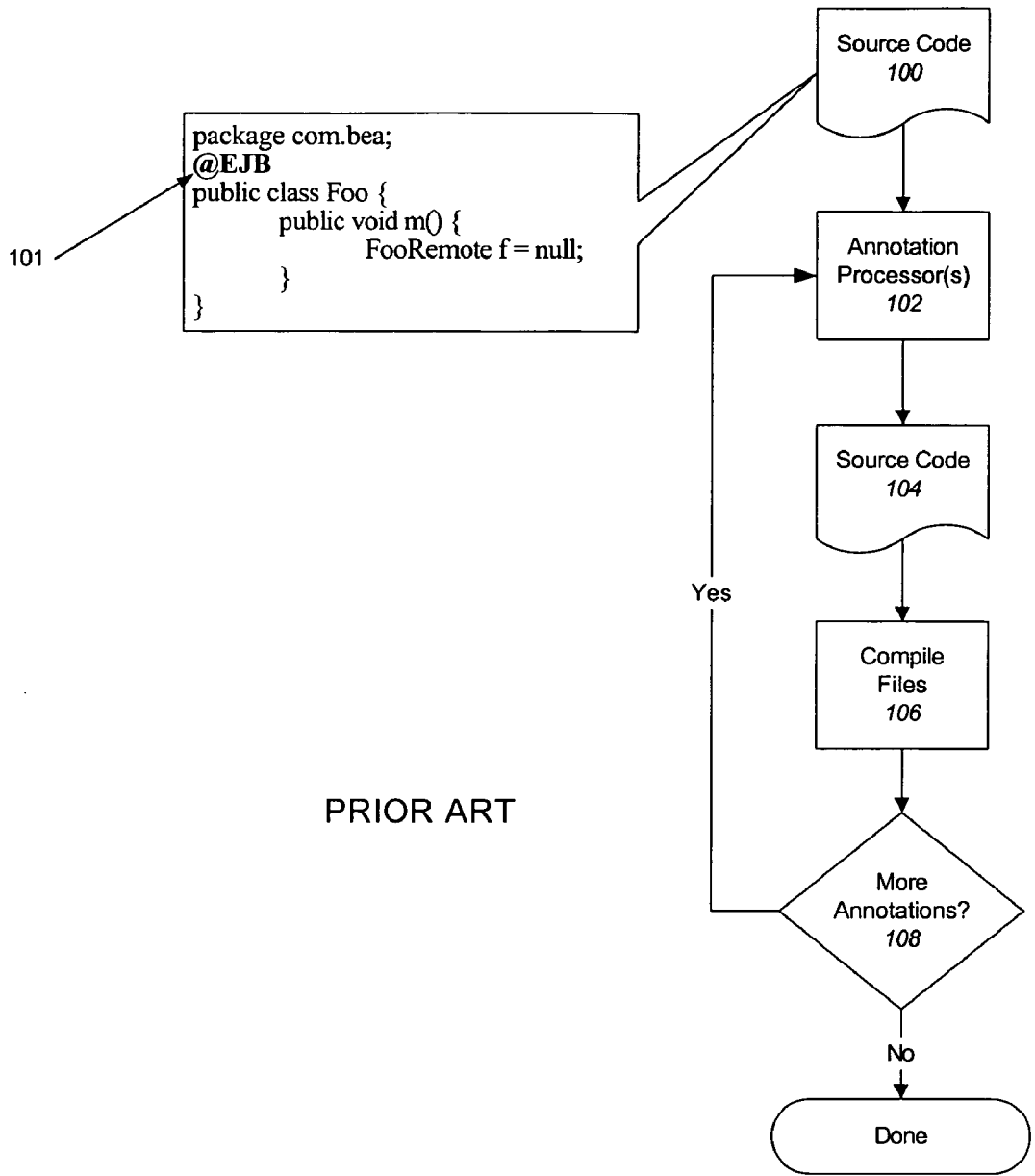
FIG. 1 is an illustration of prior art annotation processing.
Figure 2:
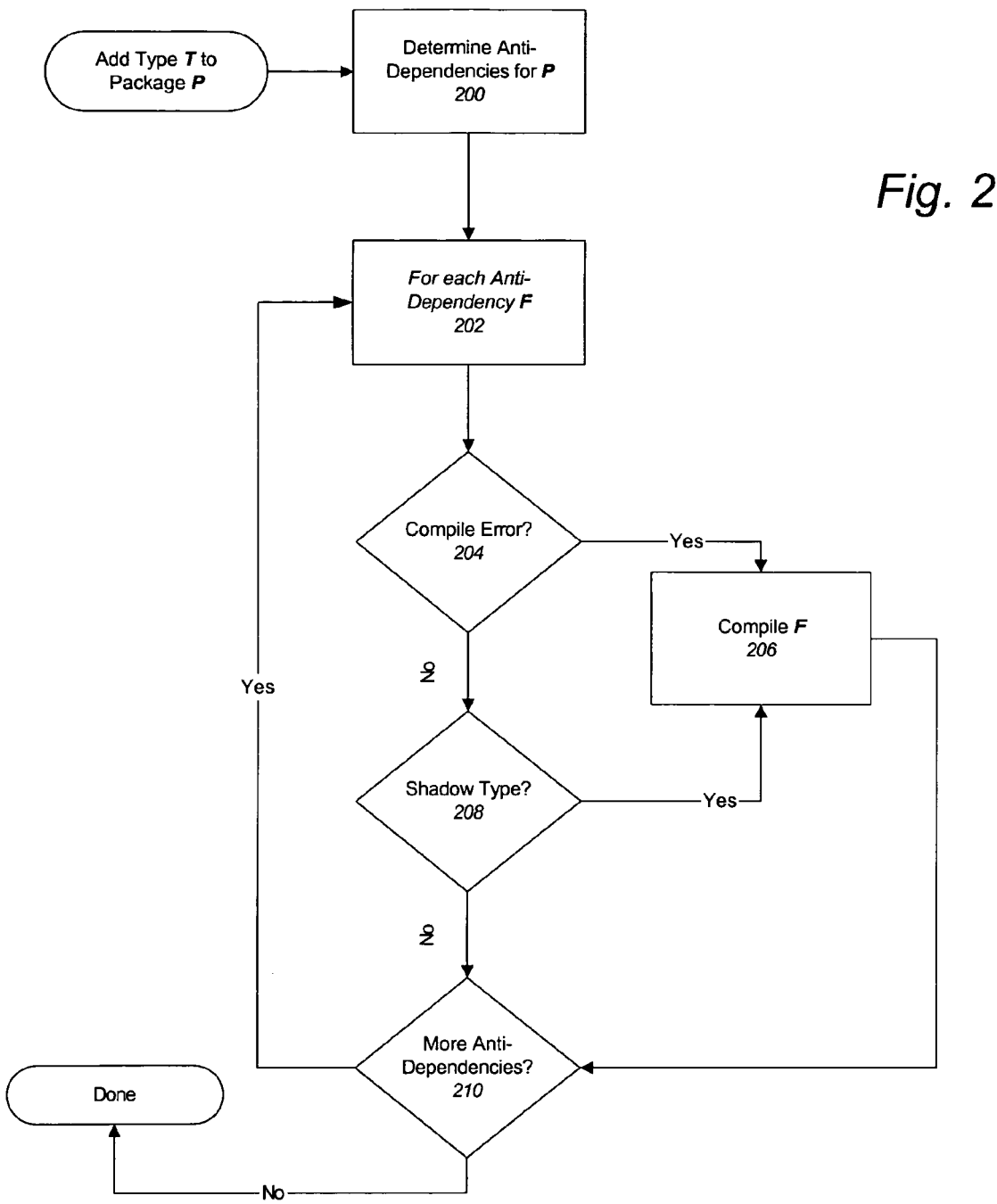
FIG. 2 is a flow diagram in an embodiment for adding a type to a package in accordance to an embodiment.

In order to implement annotation-driven analysis/code generation, we can satisfy type dependencies inside files that define the types that they depend on. By way of illustration and with reference to FIG. 1, an @EJB annotation 101 in source code 100 can be used to emit boilerplate Enterprise Java Bean classes (e.g., remote and home interface classes). On a first pass, FooRemote will not exist, and Foo will get a package dependence on com.bea. One or more annotation processors 102 generates source code 104 containing com-.bea.FooRemote. Any files that need to be newly compiled or recompiled are addressed in block 106. If more annotations need to be processed (e.g., an annotation processor itself emitted annotations in source code 104), one or more annotation processors are invoked in block 102. Otherwise, the loop is exited. A naïve implementation can end up recompiling Foo more times than necessary. FIG. 2 presents a process for overcoming this problem.

FIG. 2 is a flow diagram in an embodiment for adding a type T to a P wherein P is a package, library archive, file, module or other suitable container. In another embodiment, T is a type defined in a programming language. Although this figure depicts processing in a particular order for purposes of illustration, one skilled in the art will appreciate that various processes portrayed in this figure can be omitted, rearranged, performed in parallel, combined and/or adapted in various ways.

In block 200, anti-dependencies for P are determined. In one embodiment, an anti-dependency F is software that resides in P or is a source code file that imports P wholesale (e.g., "import *" in Java). In another embodiment, F is software that depends on P. Block 202 iterates through each anti-dependency F determined in block 200. If a given F has a compilation error, it is recompiled in block 206 with the hope that the addition of T to P will resolve the error. Otherwise, it is determined in block 208 whether or not there is a shadow type of T. In one embodiment, a shadow type has the same name and/or signature as T but resides in a package that F depends on which is not P. (See FIG. 3.) If there is a shadow type, F is recompiled in block 206. If there are more anti-dependencies to iterate over, the process continues at block 202 with another anti-dependency. Otherwise, the loop terminates.

Figure 3:
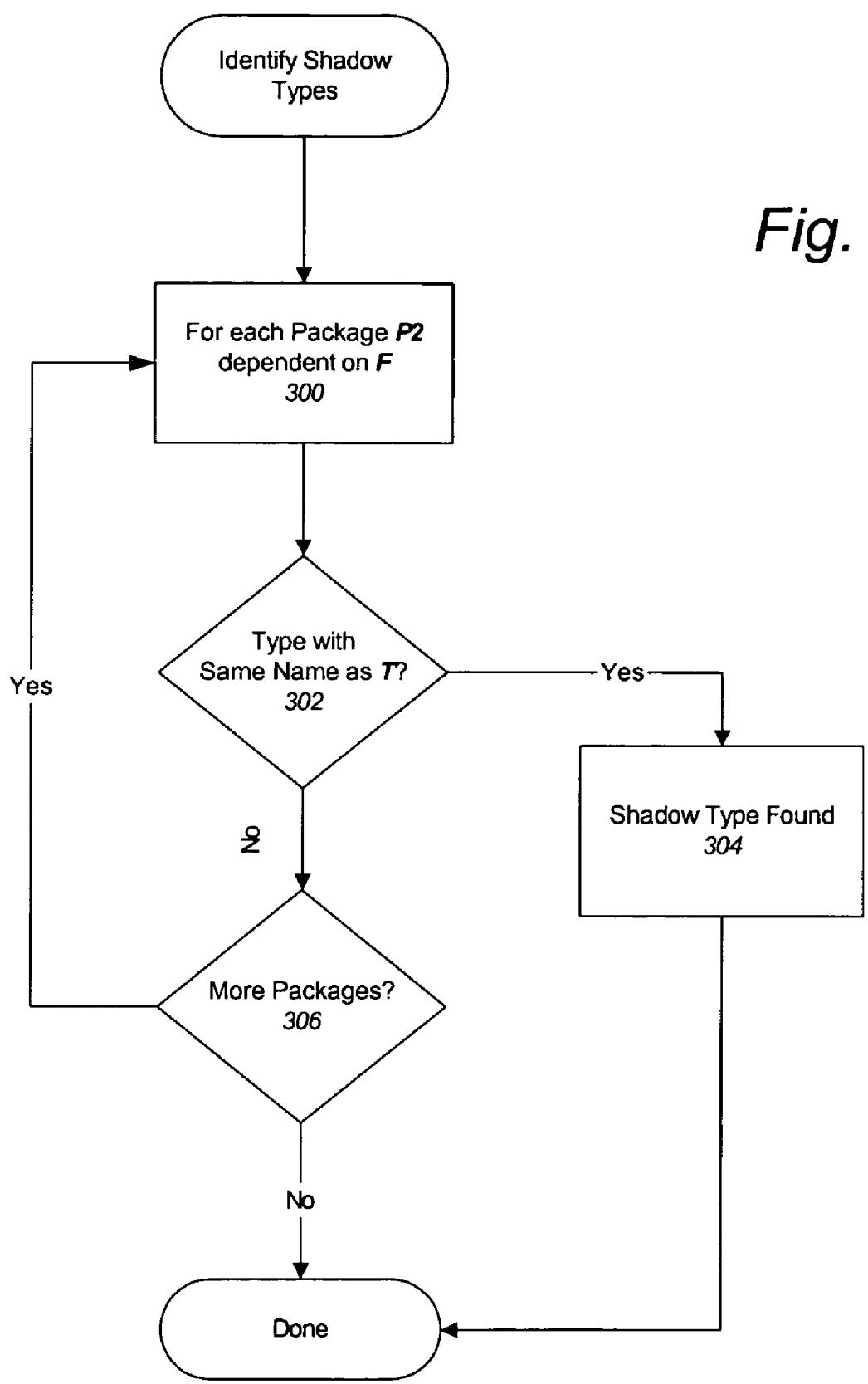
FIG. 3 is a flow diagram for determining whether or not a shadow type exists in accordance to an embodiment.

FIG. 3 is a flow diagram for determining whether or not a shadow type exists in accordance to an embodiment. Although this figure depicts processing in a particular order for purposes of illustration, one skilled in the art will appreciate that various processes portrayed in this figure can be omitted, rearranged, performed in parallel, combined and/or adapted in various ways. In block 300, For each Package P2 dependent on F (from FIG. 2), if a type with the same name (and/or signature) as T (from FIG. 2) exists in P2, then a shadow type of T has been found 304 and the process ends. Otherwise, other packages on which F depends are examined in block 300.

Various embodiments may be implemented using a conventional general purpose or specialized digital computer(s) and/or processor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits and/or by interconnecting an appropriate network of conventional component circuits, as will be readily apparent to those skilled in the art.

Various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); and any type of media or device suitable for storing instructions and/or information. Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The foregoing description of the preferred embodiments of the present invention has been provided for purposes of illustration and description. It is not intended to be exhaustive or to limit the invention to the precise forms disclosed. Many modifications and variations will be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for resolving dependencies given a first package and a first type that is added to the first package, comprising:

determining one or more anti-dependencies for the first package; and compiling a first one of the anti-dependencies when a shadow type exists for the first type, wherein the shadow type has a same name as the first type and resides in a second package that the first anti-dependency depends on, the second package is different from the first package and the second package has a second type with the same name as the first type.

2. The method of claim 1, further comprising:

adding the first type to the first package.

3. The method of claim 1, further comprising:

compiling a second one of the anti-dependencies if at least one of the following is true: 1) the second anti-dependency has a compilation error; and 2) the second anti-dependency depends on a third package wherein the third package that has a third type with the same name as the first type.

4. The method of claim 1 wherein:

a package collection of one or more types that share a common namespace.

5. The method of claim 1 wherein:

a package is a collection of one or more classes.

6. The method of claim 1 wherein:

an anti-dependency is a file that depends on a package.

7. The method of claim 1 wherein:

an anti-dependency is a file that imports a package or is part of the package.

8. The method of claim 1 wherein:
an anti-dependency contains one or more Java programming language statements.

9. The method of claim 1 wherein:
an anti-dependency includes an annotation.

10. A software development tool capable of performing method 1.

11. A non-transitory machine readable storage medium having instructions stored thereon that when used by one or more processors cause a system to resolve dependencies given a first package and a first type that is added to the first package, by:
   determine one or more anti-dependencies for the first package; and
   compile a first one of the anti-dependencies when a shadow type exists for the first type, wherein the shadow type has a same name as the first type and resides in a second package that the first anti-dependency depends on, the second package is different from the first package and the second package has a second type with the same name as the first type.

12. A system for resolving dependencies given a first package and a first type that is added to the first package, the system comprising:
   a processor;
   a memory coupled to the processor that includes components that when executed by the processor causes the processor to perform the following steps:
   determining one or more anti-dependencies for the first package; and
   compiling a first one of the anti-dependencies when a shadow type exists for the first type, wherein the shadow type has a same name as the first type and resides in a second package that the first anti-dependency depends on, the second package is different from the first package and the second package has a second type with the same name as the first type.

13. The system of claim 12 wherein the one or more components are further capable of performing the following steps:
   adding the first type to the first package.

14. The system of claim 12 wherein the one or more components are further capable of performing the following steps:
   compiling a second one of the anti-dependencies if at least one of the following is true: 1) the second anti-dependency has a compilation error; and 2) the second anti-dependency depends on a third package wherein the third package that has a third type with the same name as the first type.

15. The system of claim 12 wherein:
a package collection of one or more types that share a common namespace.

16. The system of claim 12 wherein:
a package is a collection of one or more classes.

17. The system of claim 12 wherein:
an anti-dependency is a file that depends on a package.

18. The system of claim 12 wherein:
an anti-dependency is a file that imports a package or is part of the package.

19. The system of claim 12 wherein:
an anti-dependency contains one or more Java programming language statements.

20. The system of claim 12 wherein:
an anti-dependency includes an annotation.

* * * * *